(No Model.)
J. FISHWICK.
VEHICLE WHEEL.
No. 333,402.  Patented Dec. 29, 1885.
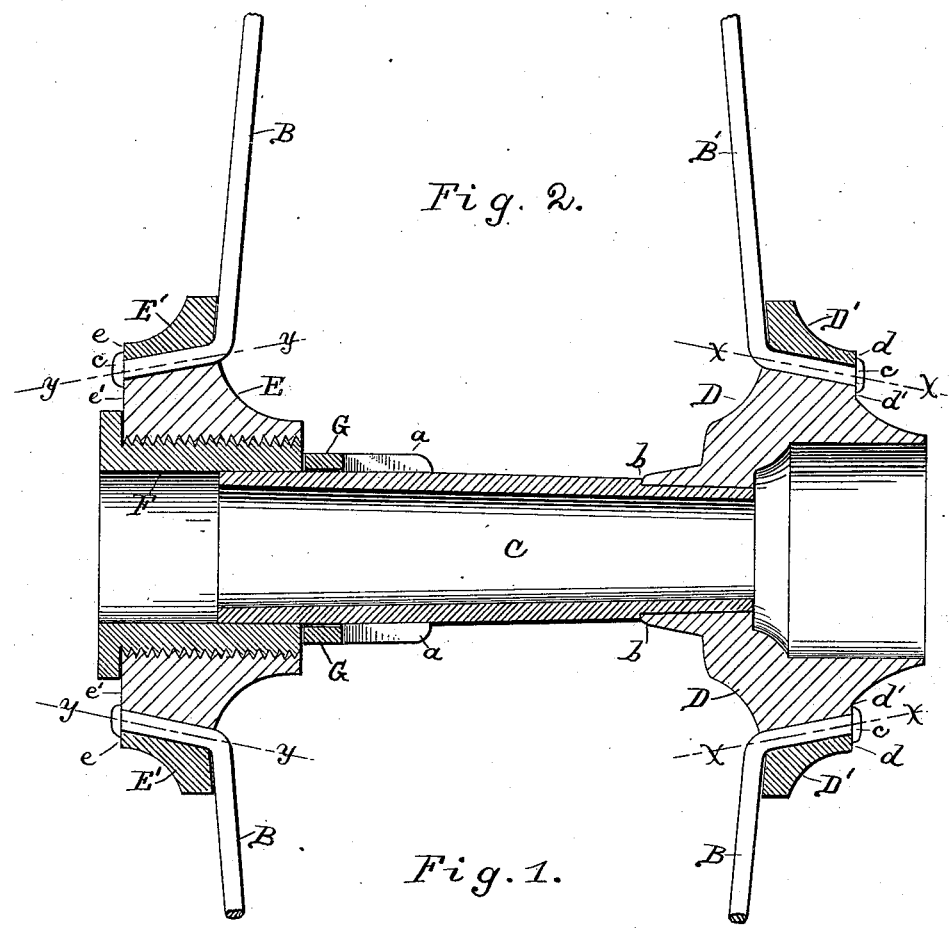
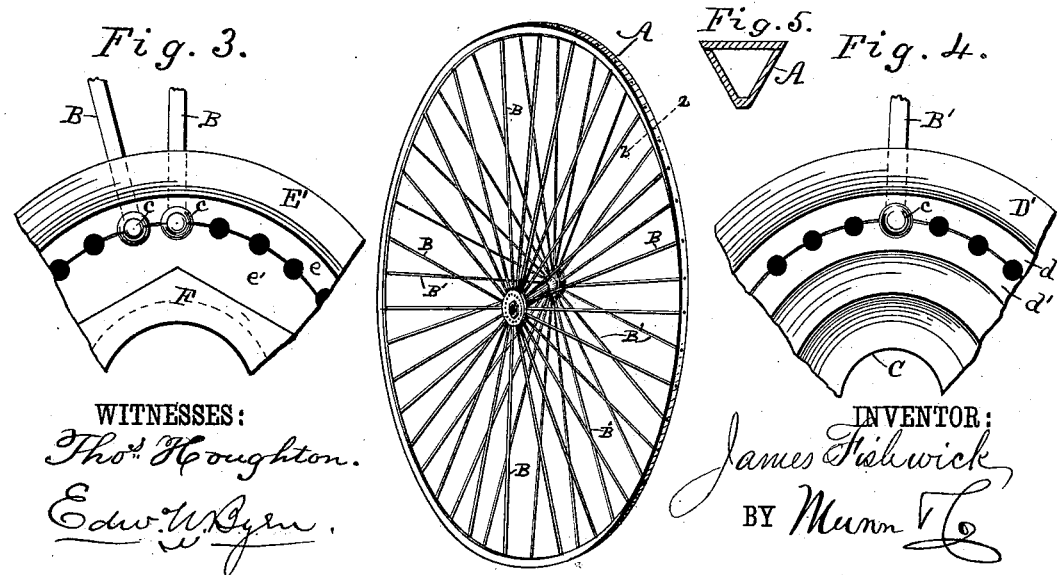
WITNESSES:
Thos. Houghton.
Edw. W. Byrn.
INVENTOR:
James Fishwick
BY Munn & Co.
ATTORNEYS.

UNITED STATES PATENT OFFICE.

JAMES FISHWICK, OF MASON, OHIO.

VEHICLE-WHEEL.

SPECIFICATION forming part of Letters Patent No. 333,402, dated December 29, 1885.

Application filed August 5, 1885. Serial No. 173,607. (No model.)

*To all whom it may concern:*

Be it known that I, JAMES FISHWICK, a citizen of the United States, residing at Mason, in the county of Warren and State of Ohio, have invented a new and useful Improvement in Vehicle-Wheels, of which the following is a description.

Figure 1 is a perspective view of the wheel. Fig. 2 is an enlarged central section of the hub. Figs. 3 and 4 are detail end views of portions of the hub, and Fig. 5 is a cross-section of the tire through line $z$ $z$ of Fig. 1.

My invention relates to that class of wheels which are known as "suspension - wheels," and which have a metal tire with steel-wire spokes, the alternate ones of which spokes are expanded away from each other at the hub to form two series, which are thrust apart and kept in tension somewhat after the manner of the bicycle-wheel.

My invention consists in the peculiar construction of the hub and its combination with the spokes, as hereinafter fully described.

In the drawings, A represents the tire, which is made hollow, of angle-steel, with an outer band, as shown in Fig. 5, and which acts as both tire and felly, and B B' are the spokes, which are formed with heads at each end, the inner ends, which fasten to the hub, being bent nearly at right angles. The heads on the inner ends of the spokes are smaller than the heads on their outer ends, so that the heads on the inner ends of the spokes will pass through the holes in the tire in fitting the spokes on the wheels, the construction of the wheel requiring the spokes to be inserted in that way.

The hub of the wheel consists of an axle-box, C, an outer flanged casting, D, and spoke-collar D', an inner flanged casting, E, and spoke-collar E', a screw-nut, F, and washer G.

In putting the wheel together the series of spokes B are secured by the flanged casting E and spoke-collar E', while the other alternating series of spokes, B', are secured by the flanged casting D and spoke-collar D', which two series of spokes are thrust away from each other and held in tension by the box C and nut F, as hereinafter described. The outer periphery of the flanged casting D is dressed to a taper, as shown by the line $x$ $x$, and the outer periphery of casting E is also dressed to a taper, as shown at line $y$ $y$, and in the adjacent edges of these tapered faces are formed half-round seats $d'$ and $e'$, which, with corresponding half-round seats, $d$ and $e$, in the adjacent edges of the spoke-collars D' E', form channel-ways to receive the bent inner ends of the spokes, the heads $c$ of which spokes rest upon the outside. Now, to hold the two series of spokes away from each other and in tension, the smaller end of the box C is made to shoulder at $b$ against the casting D, and the ribs $a$ of the other end of the box are pressed against by a washer, G, which in turn is pressed against by nut F, which is screw-threaded upon its exterior, and engages with a thread of the flanged casting E. It will therefore be seen that whenever the two castings D and E are thrust away from each other by the box C and nut F their tapered peripheries $x$ $x$ and $y$ $y$ cause the spokes to be tightly held against the spoke-collars D' and E'. When, however, the wheel is to be taken to pieces to replace any of the spokes, nut F is first turned out. The washer G and box C can then be drawn through casting E, and the two castings D and E can be brought toward each other, and as they approach they leave the spokes, and as the two series of spokes are brought together the circular row of heads $c$ of each series contract and permit the collars D' and E' to be taken off. To put the wheel together again, the collars D' E' are put over the heads $c$ of the spokes before they are expanded, the castings D and E are then fitted and separated from each other, the box C then inserted through casting E and made to bear against casting D at $b$, the washer G put on, and the nut F is then screwed into casting E, and by bearing against washer G and box C is made to tighten up the whole combination and put the spokes under tension.

The construction of wheel as thus described is rendered very simple, strong, durable, and the parts are readily removed and replaced.

In defining my invention with greater clearness, I would state that I am aware of the Patents Nos. 50,625, 303,853 and 307,021, and I do not claim anything shown therein.

My invention is distinctive, first, in the taper joint between the castings D E and the rings D' E', which cause the spoke-heads to be clamped and held with a degree of tightness which increases with the increased tension of the two sets of spokes in being thrust apart, and this enables me to use very much lighter wire for the spokes; secondly, my invention is distinctive in the construction and arrangement of box C and nut F, the said box having a plain shoulder, $b$, at one end, and lugs or bearings $a$ at the other, while the separate nut F presses in one direction on the lugs $a$ and in the other direction on the casting E, without the necessity of right and left threads, the box C being of such diameter as to allow it to readily pass through the casting E.

Having thus described my invention, what I claim as new is—

1. The combination, with the two sets of spokes B B', having bent and headed ends, of the castings D E and collars D' E', the said castings and collars being fitted with tapered joints inclined outwardly to the center, and provided with seats for the spokes, and a box for thrusting the two castings apart to tighten the spokes, substantially as shown and described.

2. The hub consisting of the two castings E D, of which E is interiorly threaded, the box C, having a bearing against the casting D at one end and a bearing, $a$, at the other, and the annular and exteriorly-threaded nut F, pressing against the bearing $a$ in one direction and the casting E in the other direction, all combined substantially as and for the purpose described.

JAMES FISHWICK.

Witnesses:
 JONAS MCCURDY,
 RICHARD H. CUNNINGHAM.